May 19, 1959
D. A. HUGHES
2,886,966
OPEN SEAM DETECTION
Filed Dec. 13, 1956
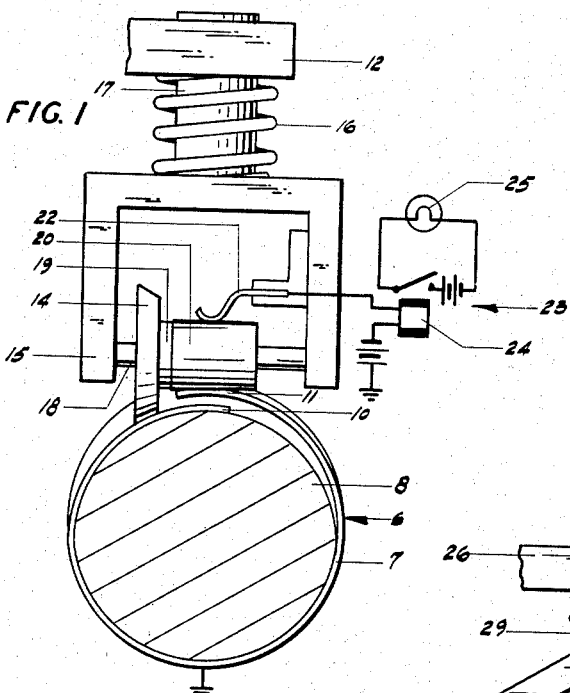
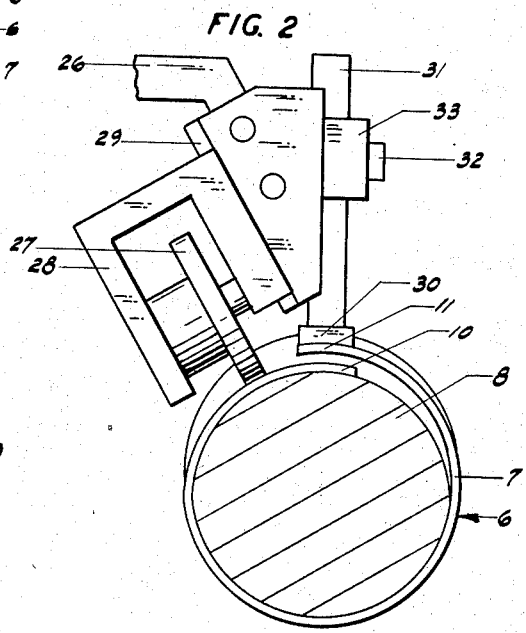
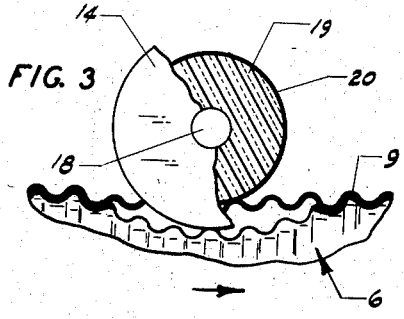
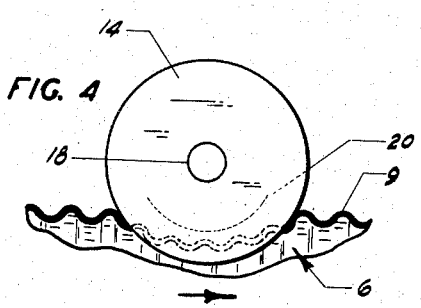
INVENTOR
D. A. HUGHES
BY
W.C. Parnell
ATTORNEY

2,886,966
OPEN SEAM DETECTION

David A. Hughes, Chatham, N.J., assignor to Western Electric Company, Incorporated, New York, N.Y., a corporation of New York Application December 13, 1956, Serial No. 628,129

8 Claims. (Cl. 73—88)

This invention relates to the manufacture of metal tubing with a longitudinally soldered or welded seam and particularly to the detection of defects or discontinuities in the seams of such tubing.

When, for example, such tubing is used as sheathing for cables, as shown in Patent 2,589,700 to H. G. Johnstone, it is particularly important that the soldered seam be continuously inspected as soon as possible after the welding or soldering operation to locate defects therein so that they may be repaired and also to permit prompt adjustment of the soldering mechanism if it is at fault.

It is, therefore, the object of this invention to continuously inspect and detect open portions in the longitudinal seam being formed in tubing or the sheathing of such moving cables.

In general, this is achieved by applying a force to one side of the seam of the longitudinally moving sheathing and determining the condition of the seam in the successive portions in terms of the relative motion of the two sides of the seam. In cases where the two sides of the seam are securely soldered or welded together, the force applied to the one side is directly transmitted to the other side through the good portions of the seam so there should be no relative or detectable motion between the sides. This is the case for both butt or overlapping seams. On the other hand, in cases where the seam is defective, the depressing force is not directly transmitted to the other side of the seam and the relative motion therebetween may be detected.

In a preferred embodiment of the invention, a wheel is supported in rolling pressure contact with one side of the seam, to depress it, and a cylindrical detector roller is supported over the other side at a predetermined distance from the normally depressed seam in the sheathing so that when the seam is open, this side of the sheathing will not be depressed and will be separated from the depressed side and make contact with the roller and close an electrical alarm or indicator circuit.

These and other features of the invention will be more fully understood from the following detailed description taken in conjunction with the accompanying drawing, in which:

Fig. 1 is an end view of a cable showing one form of open seam detector therefor;

Fig. 2 is an end view of a cable showing another form of open seam detector therefor;

Fig. 3 is a partial side view of the device of Fig. 1 with the sheathing depressing wheel broken away to show an open seam in a corrugated cable sheathing; and Fig. 4 is a partial side view of the device of Fig. 1 showing in phantom the relative position of a good seam in a corrugated cable sheathing and the detector roller.

Referring now to the drawing, the cable 6, as seen in cross-section in Figs. 1 and 2, is sheathed with either a plain or corrugated steel strip 7 longitudinally formed around the core 8 and having a soldered overlapping seam 9 (Figs. 3 and 4) extending longitudinally therealong. An overlapping seam of this type may be fabricated by sandwiching a flat strip of solder between the overlapping sides 10 and 11 of the steel sheathing strip 7 when it is formed around the cable core 8 and then while the overlap side 11 is held down against the underlap side 10, the sheathing in the vicinity of the seam is successively heated to melt the solder and then quenched. Due to defects in the materials or process, certain portions of the seam may not be soldered so that when the underlap side of the seam is depressed, as seen in Figs. 1, 2 and 3, the overlap side will be separated therefrom.

The open seam detector of Figs. 1, 3 and 4 is supported by a stationary member 12 above the seam and over the path of the cable 6 which moves axially or longitudinally in the direction of the arrow, as seen in Figs. 3 and 4. The underlap side 10 of the sheathing is depressed by the bevelled peripheral face of a roller 14 which rides thereon. The roller is supported on a yoke 15 for rotation about an axis at right angles to the principal axis of the cable core, the depressing force being obtained from a compressed helical spring 16 on an extension member 17 on the top of the yoke. The extension 17 is slidable within a slot therefor in member 12 and the spring is compressed sufficiently so that the wheel may freely follow slight vertical movements in the cable and apply a substantially constant force thereon.

Shaft 18, which supports the depressing wheel 14 in the yoke, also supports a cylindrical insulator 19 having a conductive detector roller or sleeve 20 thereon. The sleeve 20 is positioned over the seam 9 and is normally spaced from the overlap side 11 of the sheathing as seen in Fig. 4. Normally then there will be no contact between the sleeve 20 and the sheathing so long as a good soldered seam exists. However, when a seam is improperly soldered or completely open, as seen in Figs. 1 and 3, the lower underlap side 10 of the sheathing will be separated from the overlap side 11 allowing this overlapping side to make contact with the sleeve. A brush 22, insulatedly mounted to the yoke 15, connects the sleeve 20 to an alarm circuit 23 so that when the sheathing makes contact therewith, an energizing circuit for a relay 24 will be closed through the normal ground on the cable sheathing and the relay will operate to close a circuit for a lamp or buzzer device 25.

The other embodiment of the invention disclosed in Fig. 2 may be resiliently supported from a stationary member (not shown) by means of the arm 26 so that a wheel 27, which is rotatably supported on a yoke 28, may exert a depressing pressure towards the center of the cable 6 on the underlapping side 10 of the sheathing 7. The yoke 28, in this case, is mounted on a wedge-shaped member 29 on member 26. The member 29 also supports a conductive detector bar 30 insulatedly attached to the lower end of an adjustable rod 31. The rod 31 may be locked in an adjusted position on the member 29 by means of a set screw 32 in a clamp 33 so that the face of the bar, which is arcuately shaped to conform generally with the curvature of the sheathing 7, may be set at any convenient distance from the normally depressed overlap side 11 of the sheathing which has been found to give good results for the particular size and type of cable sheathing used. The bar 30 serves the same sheathing-contacting function as the cylindrical sleeve 20 of the device of Fig. 1. An electrical connection may be made directly from the member 30 to an alarm circuit similar to that shown as 23 in Fig. 1. In operation, the wheel 27 of the device of Fig. 2 exerts a downward pressure on the underlap side 10 of the sheathing to depress it and, as before, in the event that the seam is good, the overlap side 11 will be deflected sufficiently to clear the member 30. In the event that the seam is open, however, the overlap side 11 of the sheathing will not be sufficiently deflected and will make contact with the detector bar 30, thereby closing the alarm circuit, as in Fig. 1.

In the event that the depressing force required to deflect a corrugated sheathing is so large that the wheels 14 or 27 score or permanently deform the metal sheathing, the contacting peripheries of the wheels may be provided with rounded teeth which would mesh with the corrugations of the sheathing. The depressing force then would be distributed over more surface area of the sheathing and the objectionable deformation would be eliminated or greatly reduced.

While the features of the invention have been described in connection with open seam detection of overlapping seams on a corrugated sheathing, it is to be understood that the principles of this invention apply equally to butt or overlapping seams in either corrugated or non-corrugated tubings.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a device for detecting discontinuities in the longitudinal seam of a tubular member moving longitudinally in a predetermined path, means for applying to successive portions of one side of the seam a force tending to open the seam and indicator means cooperating with the other side of the seam and responsive to the relative motion between the two sides of the seam to indicate discontinuities in the seam.

2. A device for detecting discontinuities in the longitudinal seam in a tubular metal member moving longitudinally in a predetermined path, which comprises a wheel, means for supporting the wheel for rotation about an axis normal to the direction in which the tubular member is moved so that the peripheral surface of the wheel rolls along and depresses one side of the seam of the moving member, and indicator means including a detector member for the other side of the seam located adjacent the wheel and at a predetermined distance from the normally depressed tubular member for contacting said other side only when the depressed portion of the seam is open.

3. A device according to claim 2 in which the detector member is a cylindrical roller rotatably mounted over the seam adjacent the wheel on the support.

4. A device according to claim 3 having a normally open alarm circuit including the moving member, and the roller which is closed when the seam passing between the wheel and the roller is open and the side opposite the wheel contacting side engages the roller.

5. A device according to claim 2 in which the detector member has an arcuate face conforming to the contour of the opposing surface of the moving sheathing and is adjustably mounted to the support for the wheel.

6. A device for locating openings in longitudinally soldered seams in a longitudinally formed metal sheathing surrounding a cable core moving axially along a prescribed path comprising a wheel having a bevelled peripheral face conforming generally to the contour of the sheathing adjacent the side of the seam, a fixed support member along said path, a yoke for rotatably supporting the wheel, means for resiliently mounting the yoke on the fixed support over the seam in a moving cable sheathing so that the bevelled face of the wheel makes a rolling, sheathing-depressing contact with the conforming surface of the sheathing adjacent one side of the seam, a conductive contactor sleeve insulatedly mounted for rotation on the yoke adjacent the wheel, said sleeve being located at a prescribed distance from a normally depressed, securely soldered seam and which may be contacted by the non-depressed side when the soldered seam therebetween is discontinuous, a normally inoperative alarm circuit, and means for actuating the alarm circuit whenever the sheathing contacts the sleeve.

7. A device for detecting defects in a longitudinally moving member having a longitudinal seam therein, which comprises means for applying to successive increments of the member at one side of the seam a force tending to open the seam, and means responsive to relative motion between the two sides of the seam for detecting discontinuities in the seam.

8. A device for detecting defects in a longitudinally moving member having a longitudinal seam therein, which comprises means for applying to successive increments of the member at one side of the seam a force tending to open the seam, and means engageable by the other side of the seam and responsive to relative movement between the two sides of the seam for detecting discontinuities in the seam.

References Cited in the file of this patent

UNITED STATES PATENTS

| | | |
|---|---|---|
| 949,451 | Seragnoli | Feb. 15, 1910 |
| 2,355,719 | Fedorchak | Aug. 15, 1944 |
| 2,710,344 | Hullam | June 7, 1955 |